April 11, 1967 KINJI YOSHIKAWA 3,313,546

SUPPORTING DEVICE FOR A PHONOGRAPH PICKUP

Filed May 28, 1964 2 Sheets-Sheet 1

INVENTOR
KINJI YOSHIKAWA

BY Wenderoth, Lind & Ponack

ATTORNEYS

SUPPORTING DEVICE FOR A PHONOGRAPH PICKUP

Filed May 28, 1964 2 Sheets-Sheet 2

INVENTOR
KINJI YOSHIKAWA

BY Wenderoth, Lind and Ponack

ATTORNEYS

United States Patent Office 3,313,546
Patented Apr. 11, 1967

3,313,546

SUPPORTING DEVICE FOR A PHONOGRAPH PICKUP

Kinji Yoshikawa, 18 Ohmino, Sakai, Japan
Filed May 28, 1964, Ser. No. 370,821
Claims priority, application Japan, May 30, 1963, 38/28,390
4 Claims. (Cl. 274—23)

This invention relates to the supporting device for a phonograph pickup, more particularly to the supporting device for a phonograph pickup which is moved according to the hereinafter described special transfer locus of the position of the support for the pickup arm during movement of the needle point on a phonograph record during its playback. The object of the invention is to provide a means of great practical use, by which the tone arm is always kept in a position during the playback in which it is at the most suitable angle relative to the sound track of the record, said means transferring the supporting position of the tone arm, so that the line connecting the said supporting position of the tone arm and the needle point may always be tangent to the sound track at the contact point of the needle point with the record.

It is generally recognized in theory that, in order to have the best playback, to say nothing of protecting the disk from damage, the line connecting the supporting position of the pickup arm and the needle should be tangent to the sound track at the contact point of the said needle. In practice, however, the pickup arm is pivotally held in only one position, so that there is only one point along the whole sound track where the above mentioned requirement for the best playback is met. As a result, it is inevitable that, at the other points of the track, the playback is not satisfactory as the tonal quality is inferior and the record is damaged due to tracking errors, an inwardly directed force or an outwardly directed force brought about by the improper angle of the needle relative to the sound track, and the said inferior tonal quality seriously affects the stereophonic playback in particular. In order to solve the above-mentioned difficulty, a method in which the supporting point of the tone arm is moved parallel to the movement of the needle point along the sound track has been suggested. But, it is complicated and troublesome to install and operate the equipment required for such a method. As a result, the said suggestion has never been put into practice.

In the present invention which is theoretically different from the above suggestion, two concentric imaginary circles are presumed to pass through points on two lines tangent to the exterior peripheral and interior peripheral sound tracks of a record at the points of intersection of any straight line coming radially from the center of the disk with the exterior peripheral sound track and the interior perimetric sound track, the distance from the said two points on the tangent line to the said straight line coming radially from the center of the disk being equal to the distance from the needle point to the pivot of the tone arm. A line between points on the respective imaginary circles is the transfer locus of the tone arm. In other words, the supporting position or the pivot of the tone arm is so arranged as to travel from one point on a circular arc or the straight line from its intersection with the said exterior concentric imaginary circle to the other point on the said circular arc or the straight line where it intersects the said interior concentric imaginary circle, during the movement of the needle point.

For a more detailed description of the invention, reference will now be made to the accompanying drawings wherein.

Figure 1:
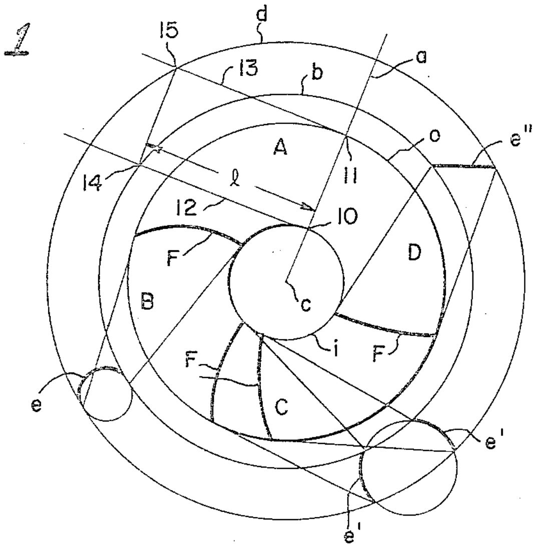
FIGURE 1 is a diagram for explaining the said transfer locus of the supporting position of the tone arm of the invention.

As shown in the part of FIGURE 1 designated A, the letter *l* is the distance between the needle point and the supporting position of the tone arm and C is the center of the record or turntable, while the exterior peripheral sound track is indicated by O and the interior peripheral sound track by *i*. Any radial straight line *a* coming from the center of the record intersects the interior peripheral sound track *i* and the exterior peripheral sound track at the points 10 and 11 respectively, and two imaginary circles *b* and *d* which are concentric with the center of the disk are drawn so as to pass through the points 14 and 15 on lines tangent to the said points 10 and 11, the distance from the points 10 and 11 to the said points 14 and 15 being *l*. A circular arc *e* which just touches the said imaginary circles *b* and *d* (part B of FIGURE 1) or a circular arc *e'* which intersects the imaginary circles *b* and *d*, or a straight line *e''* which intersects the said imaginary circles *b* and *d* can be drawn, and the portion between the said points *b* and *d* of any of the above-mentioned lines *e*, *e'* and *e''* can be the transfer locus *m* of the supporting position of the tone arm. As the needle point of the tone arm moves along the sound track, the supporting position of the tone arm is so arranged as to move from the said intersecting point on the exterior imaginary circle *d* to the interior imaginary circle *b*, so that the line connecting the supporting position of the tone arm and the needle point will always be tangent to the sound track at the point the needle contacts the sound track. The transfer locus of the needle point at this moment is indicated by F.

However, it should be noted that the movement of the supporting position of the pickup arm upon the said locus in order to make the connecting line between the needle point and the supporting position of the tone arm tangent to the sound track at the point where the needle point touches the sound track is not uniform. Actually the transfer speed of the pickup arm must be reduced as the supporting position of the pickup arm moves from the exterior peripheral section of the sound track toward the inside. The alteration of the above transfer speed of the tone arm can be determined diagrammatically.

Figure 2:
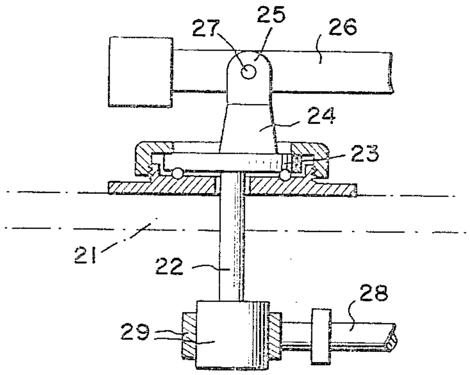
FIGURE 2 is an elevation view of a simple mechanism of the tone arm partly in section.

In the present invention, the supporting position of the pickup arm is transferred in accordance with the movement of the needle point. FIGURE 2 shows one of the examples of a specific embodiment where the supporting position of the tone arm is transferred along the said locus. A supporting stand 24 for the said tone arm is mounted on the disk 23 at a position offset from a shaft 22 on which the disk 23 is pivotally supported and which passes through the table 21. The offsetting of the said supporting strand 24 from the pivot 22 is at a distance equal to the radius of the said transfer locus and the supporting stand 24 is arranged to move by the rotation of the pivot 22 along the arc-shaped transfer locus. On the support 25, which is provided upon the said supporting stand 24 so as to be rotatable in the horizontal direction, the base of the tone arm 26 is pivotally mounted on the horizontal shaft 27, so that the pickup arm 26 will be rotatable laterally as well as up and down.

The pivot 22 is driven by the driving shaft 28 through the reduction gear 29 consisting of a worm and worm gear, so that said supporting stand 24 will move along the locus before the needle point of the tone arm reaches the end of the sound track.

Figure 3:
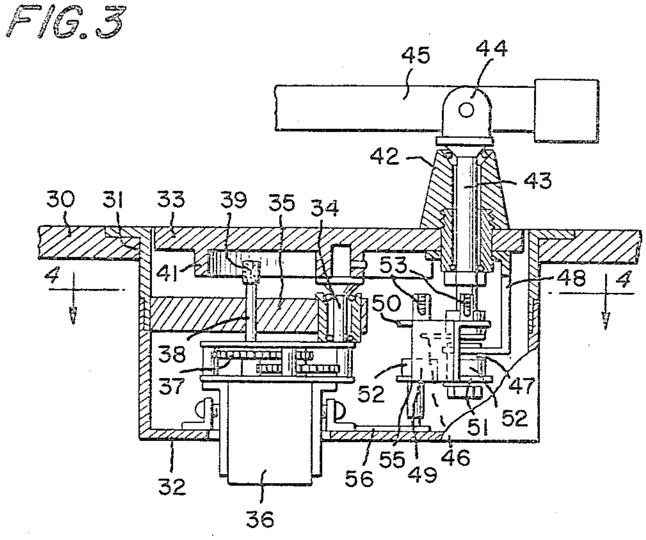
FIGURE 3 is an elevation view of another embodiment of the invention partly in section.
Figure 4:
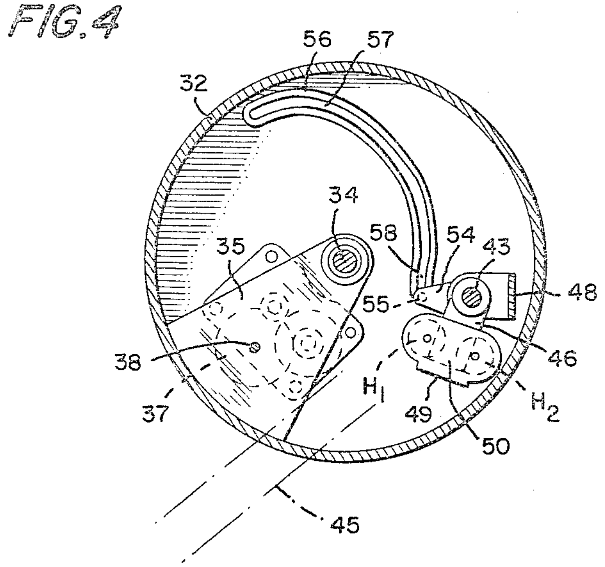
FIGURE 4 is the sectional plan view taken on line 4—4 of FIGURE 3.

In FIGURES 3 and 4, one practical embodiment of the invention is shown, wherein the case 32 is attached at a circular notch 31 to the table 30 and in the said case is fixed a rotary disk 33, the pivot 34 of which is rotationally supported by an arm 35 fixed to the said case 32. In the case 32 is provided a micromotor 36, the shaft of which drives the driving shaft 38 through a group of reduction gears, and on the upper end of which is mounted a friction material such as rubber or the like and which is made to slidingly contact the inner side of a flange 41, so that the rotary disk 33 is driven by the revolving micro motor 36. Upon the rotary disk 33 is mounted a supporting base 42 for the tone arm at a position offset from the shaft 34 and the support 44 of tone arm is mounted on the top of the rotary shaft 43 and upon the said support 44 is pivotally mounted the tone arm 48 with its horizontal shaft.

The said rotary shaft 43 downward below rotary disk 33 and at its end is fixed the screening plate 46 which projects sideways. Below the said rotary shaft 43, a short shaft 47 is supported coaxially therewith by an L-shaped arm 48 which is fixed to the rotary disk 33 and on the said short shaft 47 is rotatably mounted the extension of one end of a supporting frame 49 which is bent so as to be channel-shaped, with upper and lower frame plates 50 and 51 thereof positioned above and below the said screening plate 46. A pair of photoelectric element $H_1$ and $H_2$ consisting of a CdS cell or other photoelectric body 52 and an illuminating member 53 are provided on the said upper and lower frame plates 50 and 51, while a pin 55 is positioned below a lug 54 which is provided on the lower frame plate 51 and the tip of said pin 55 is inserted into a guide groove 57 in a guide plate 56 which is fixed to the case 32.

The shape of said guide groove 57 is determined diagrammatically from the respective corresponding points of the transfer locus F of the contacting points of the needle on the sound track and the transfer locus of the supporting position of the tone arm. At the starting end of the said guidance groove 57 is provided a starting groove 58, while the pin 55 is positioned in the starting groove 58 which is spaced from a given point on the transfer locus of the supporting position of the tone arm the same distance as between the short shaft 47 and the pin 55. It is this condition which controls the contacting point of the needle for bringing the tone arm into line tangent to the sound track at the contacting point of the needle. The screening plate 46 indicates the supporting position of the tone arm and the actual angle of the said arm, and the supporting position of the tone arm which is most suitable for the contacting point of the needle is established by means of the photoelectric apparatus and the micro motor. These parts are so arranged that, when the screening plate 46 is in the neutral position so that it screens neither one of the rays of light of the photoelectric apparatuses, the angle of the pickup arm is in line with the tangent at the contacting point of the needle and the output of the photoelectric apparatuses $H_1$ and $H_2$ is suitably amplified respectively, while the micro motor 36 is rotated in one direction or the other depending on how much light passes the screening plate from one or the other illuminating members.

When the pickup arm 45 is transferred from its starting position to an exterior peripheral position in the sound track, the pin 55 moves in the starting groove 58 at the starting end of the guide groove blocking the ray of light of the photoelectric apparatus $H_1$ by means of the screening plate 46. Consequently the output power of the photoelectric apparatus $H_1$ becomes zero and the micro motor is driven to revolve the disk 33 and the supporting position of the tone arm is moved along its transfer locus, while the screening plate 46 is moved together therewith and until the rays of light of both photoelectric apparatuses are not screened out, at which time the supporting position of the tone arm has been moved and then the micro motor 36 stops. However, since the tone arm moves as the phonograph record revolves and the screen plate 46 also moves, the photoelectric apparatus $H_1$ and the micro motor 36 drive the revolving disk which supports both photoelectric apparatuses and control the supporting position of the tone arm so as to follow the movement of the screening plate 46. They further move the said supporting position of the tone arm along its transfer locus to the position corresponding to the position of the contacting point of the needle, so that hoped-for object is attained and the playback is completed. When the tone arm within the sound track stops, its supporting position also ceases to move.

When the said arm is moved back, the light source of the photoelectric apparatus $H_2$ is screened out by the screening plate 36 and the micro motor rotates in the opposite direction to move the supporting position of the tone arm back. The starting groove 58 is provided to permit the tone arm to be moved outward further than the exterior peripheral sound track.

The supporting position of the tone arm stops moving at the position, where the movement of the said arm is stopped and the movement of said supporting position is controlled to follow it.

While preferred embodiments have been described above in detail, it will be understood that numerous modifications might be resorted to without departing from the scope of the invention as defined in the following claims.

What I claim is:

1. In a phonograph having a turntable adapted to hold a record having an interior peripheral sound track and an exterior peripheral sound track, a tone arm, and a needle on one end of the tone arm adapted to run in said sound track, the combination of a tone arm pivotal support for pivotally supporting the tone arm at a pivot point, and drive means on which said pivotal support is mounted and driving said pivotal support from a point on an outer imaginary circle which is the locus of all points which are spaced along tangents to points on said exterior peripheral sound track a distance equal to the distance between the point at which said needle contacts the sound track and the pivot point of the tone arm, to a point on an inner imaginary circle which is the locus of all points which are spaced along tangents to points on said interior peripheral sound track a distance equal to the distance between the point at which said needle contacts the sound track and the pivot point of the tone arm.

2. The combination as claimed in claim 1 in which said tone arm pivotal support comprises a disc rotatably mounted on said phonograph for rotation in a plane parallel to the plane of horizontal movement of the tone arm, a support member eccentrically mounted on said disc for pivotally supporting said tone arm thereon, a drive shaft connected to the center of said disc, and drive means driving said drive shaft in accordance with the rotation of the turn table.

3. The combination as claimed in claim 1 in which said tone arm pivotal support comprises a disc rotatably mounted on said phonograph for rotation in a plane parallel to the plane of horizontal movement of the tone arm, a support member eccentrically mounted on said disc for pivotally supporting said tone arm thereon, a drive shaft connected to the center of said disc, a motor means coupled to said drive shaft for driving said drive shaft, a control shaft to which said tone arm is coupled and extending downwardly from said support member, motor control means mounted on said disc for movement with said disc and coupled to said motor means for driving said motor means in one direction or the opposite direction, and actuating means cooperable with said motor control means for actuating said motor control means and coupled to said control shaft and movable relative to said motor control means during relative movement between said actuating means and said motor control means as said tone arm and said disc move relative to each other.

4. The combination as claimed in claim 3 in which said motor means in a micromotor, said motor control means comprises a pair of photoelectric means each including a source of light and photosensitive means, and said actuating means comprises a shield which is movable between the source of light and the photosensitive means for blocking and unblocking the light as said tone arm moves relative to the turntable for driving the micromotor and thereby rotating the disc, said motor control means further comprising a track member on said phonograph and a follower engaged with said track and mounted on said motor control means, said motor control means being pivotally mounted on said disc for pivoting movement relative to said disc as well as movement along with said disc, said track having a shape corresponding to the path of movement of the needle on the tone arm and the path of movement of the tone arm pivotal support.

References Cited by the Examiner

UNITED STATES PATENTS

| | | | |
|---|---|---|---|
| 2,006,605 | 7/1935 | Putnoky | 274—23 |
| 2,585,396 | 2/1952 | Martin | 274—23 |
| 2,966,360 | 12/1960 | Herve | 274—23 |

NORTON ANSHER, *Primary Examiner.*

C. B. PRICE, J. F. PETERS, *Assistant Examiners.*